United States Patent
Reyes et al.

(10) Patent No.: US 8,082,276 B2
(45) Date of Patent: Dec. 20, 2011

(54) TECHNIQUES USING CAPTURED INFORMATION

(75) Inventors: August de los Reyes, Bellevue, WA (US); Paul E. Henderson, Redmond, WA (US); Ruston Panabaker, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 410 days.

(21) Appl. No.: 11/650,664

(22) Filed: Jan. 8, 2007

(65) Prior Publication Data
US 2008/0168050 A1 Jul. 10, 2008

(51) Int. Cl.
*G06F 17/30* (2006.01)
(52) U.S. Cl. .................. 707/802; 707/804; 707/912
(58) Field of Classification Search .................. None
See application file for complete search history.

(56) References Cited

U.S. PATENT DOCUMENTS

| | | | |
|---|---|---|---|
| 6,438,575 B1 | 8/2002 | Khan et al. | |
| 6,594,682 B2 | 7/2003 | Peterson et al. | |
| 6,789,077 B1 | 9/2004 | Slaughter et al. | |
| 7,003,506 B1 | 2/2006 | Fisk et al. | |
| 7,289,806 B2 * | 10/2007 | Morris et al. | 455/432.3 |
| 7,574,453 B2 * | 8/2009 | Julia et al. | 707/104.1 |
| 7,596,269 B2 * | 9/2009 | King et al. | 382/177 |
| 2002/0107918 A1 | 8/2002 | Shaffer et al. | |
| 2002/0174117 A1 | 11/2002 | Nykanen | |
| 2003/0046703 A1 | 3/2003 | Knowles et al. | |
| 2003/0131100 A1 | 7/2003 | Godon et al. | |
| 2004/0213409 A1 | 10/2004 | Murto et al. | |
| 2005/0021673 A1 | 1/2005 | Frohlich et al. | |
| 2006/0023945 A1 | 2/2006 | King et al. | |
| 2006/0026271 A1 * | 2/2006 | Julia et al. | 709/223 |
| 2006/0041605 A1 * | 2/2006 | King et al. | 707/205 |
| 2006/0092291 A1 * | 5/2006 | Bodie | 348/231.99 |
| 2006/0129931 A1 | 6/2006 | Simons et al. | |
| 2007/0055651 A1 * | 3/2007 | Yamanaka et al. | 707/3 |
| 2008/0086539 A1 * | 4/2008 | Bloebaum et al. | 709/217 |

FOREIGN PATENT DOCUMENTS

| | | |
|---|---|---|
| KR | 1020060041465 A1 | 5/2006 |
| WO | WO0197151 A1 | 12/2001 |

OTHER PUBLICATIONS

Tony Northup, "Downloading Pictures from Your Digital Camera", Sep. 15, 2005, <http://www.microsoft.com/windowsxp/using/digitalphotography/takeit/transfer.mspx>, pp. 1-3.*
myspace.com, "MySpace", Copyright 2006, <http://web.archive.org/web/20061222042852/http://www.myspace.com/>, pp. 1-2.*
Brody et al., "Pocket BargainFinder: A Handheld Device for Augmented Commerce", http://www.accenture.com/NR/rdonlyres/5042EB67-67C9-41A4-A712-9F0C3ED25059/0/Pocket Bargain FinderHUC99.pdf#search=%22%22Pocke%20BargainFinder%3A%20A%20Handheld%20Device%20for%20Augmented%20Commerce%22%2Bpdf%22.

(Continued)

*Primary Examiner* — Hung Q Pham

(57) ABSTRACT

Techniques are provided utilizing captured information. The captured information includes at least one of audio and image information. In response to connecting a capture device including the captured information to another device, the captured information is downloaded to the other device, a text portion is formed corresponding to the captured information, and at least a portion of the captured information and text portion is stored. A selected action is automatically performed using at least one of the text portion and the captured information.

20 Claims, 11 Drawing Sheets

OTHER PUBLICATIONS

Buyukkokten et al., "Seeing the Whole in Parts: Text Summarization for Web Browsing on Handheld Devices", Date: 2001, pp. 652-662, ACM Press, New York, US, http://delivery.acm.org/10.1145/380000/372178/p652-buyukkokten.pdf?key1=372178&key2= 1206038511& coll=portal&dl=ACM&CFID=11111111& CFTO KEN=2222222.

Jones et al., "From Sit-Forward to Lean-Back: Using a Mobile Device to Vary Interactive pace", http://www.cs.waikato.ac.nz/~mattj/sflbworkingpaper.pdf.

International Search Report cited in related Application No. PCT/US2007/088966 dated Apr. 30, 2008.

\* cited by examiner

TECHNIQUES USING CAPTURED INFORMATION

BACKGROUND

Existing search engines may be accessible from a computer. The search engine may be used to perform queries of content found on the Internet as well as queries of other data sources such as a database. The search engine may be used to perform such queries while the computer has connectivity to a network or other data source to be searched. The search engine may include a user interface to facilitate obtaining search queries in an interactive manner. One drawback of the foregoing is that a user's computer or network used to connect the computer to the search engine or data source to be searched may be having problems. As such, when the user wants to perform a query, the computer may not have connectivity to the search engine, data source to be searched, and the like. In such instances, the user may have to access the search engine or data source at a later point in time when existing problems have been resolved in order to enter the search query, perform the search, and obtain any search results.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques are provided for utilizing captured information. The captured information may be include audio and/or image information which is converted to text. An action may be automatically selected and performed based on inferences from the text. The action may use a portion of the captured information and text. The automatic selection of an action may be enabled/disabled in accordance with a setting. The captured information may be stored along with other information in a server providing an aggregation service in connection with the captured information, the text for the captured information, and/or action results for the captured information. In response to connecting a capture device including the captured information to another device, processing may be performed which includes: downloading the captured information from the capture device to the other device, forming a text portion corresponding to the captured information, and storing at least a portion of the captured information and text portion.

DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Figure 1:
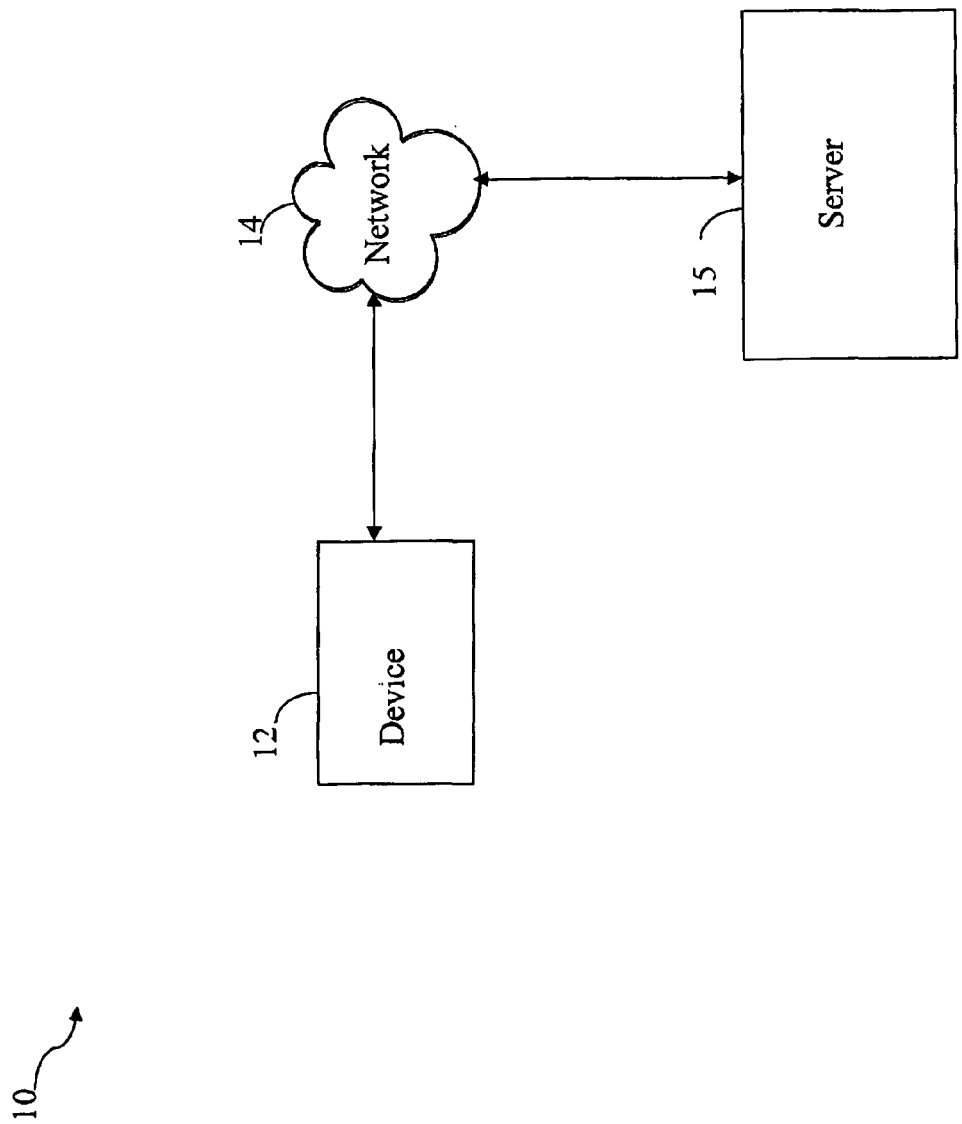
FIG. 1 is an example of an embodiment illustrating an environment that may be utilized in connection with the techniques described herein.

Referring now to FIG. 1, illustrated is an example of a suitable computing environment in which embodiments utilizing the techniques described herein may be implemented. The computing environment illustrated in FIG. 1 is only one example of a suitable computing environment and is not intended to suggest any limitation as to the scope of use or functionality of the techniques described herein in connection with capturing information and using captured information in connection with a variety of different applications. Those skilled in the art will appreciate that the techniques described herein may be suitable for use with other general purpose and specialized purpose computing environments and configurations. Examples of well known computing systems, environments, and/or configurations include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The techniques set forth herein may be described in the general context of computer-executable instructions, such as program modules, executed by one or more computers or other devices. Generally, program modules include routines, programs, objects, components, data structures, and the like, that perform particular tasks or implement particular abstract data types. Typically the functionality of the program modules may be combined or distributed as desired in various embodiments.

Included in FIG. 1 are a device 12, a network 14, and a server 15. The device 12 may be, for example, a computer having a display or output device such as a personal or desk top computer. The device 12 included in FIG. 1 is exemplary for purposes of illustrating the techniques described herein in connection with an audio and image capture device that may be used with a computer or other device 12. In one embodiment, any device that has connectivity to the server 15 and having the functionality described herein may be included in an embodiment. The device 12 may include a processor used to execute code included in one or more program modules. Described in more detail elsewhere herein are program modules that may be executed by the device 12 in connection with the techniques described herein. The device 12 may operate in a networked environment and communicate with the communications server 15 and other computers not shown in FIG. 1. As described herein, the device 12 may be a personal computer. In other embodiments, the functionality of device 12, or the device 12 itself, may be included in another component in accordance with a particular environment in which the device 12 is utilized.

The server 15 may communicate with device 12 when connected to the network 14. The server 15 may include one or more applications and associated data for use in connection with communications to device 12. For example, the server 15 may host a server portion of an electronic calendar and messaging program, and other applications. The device 12 may include a client-side application for use with the electronic calendar and messaging program which, when connected to the server 15, communications with the respective server-side application and utilizes data stored at the server 15. The device 12 may also include, for example, a web browser used to access a website hosting a search engine. The search engine may be used to perform queries of Internet-based content utilizing the techniques herein to obtain the queries.

It will be appreciated by those skilled in the art that although the device 12 is shown in the example as communicating in a networked environment, the device 12 may communicate with other components utilizing different communication mediums. For example, the device 12 may communicate with one or more components utilizing a network connection, and/or other type of link known in the art including, but not limited to, the Internet, an intranet, or other wireless and/or hardwired connection(s).

It should also be noted that although the device 12 is illustrated as having connectivity to a server 15, the techniques described herein may be used in connection with a device 12 operating standalone without external connection to a server and/or network.

Figure 2:
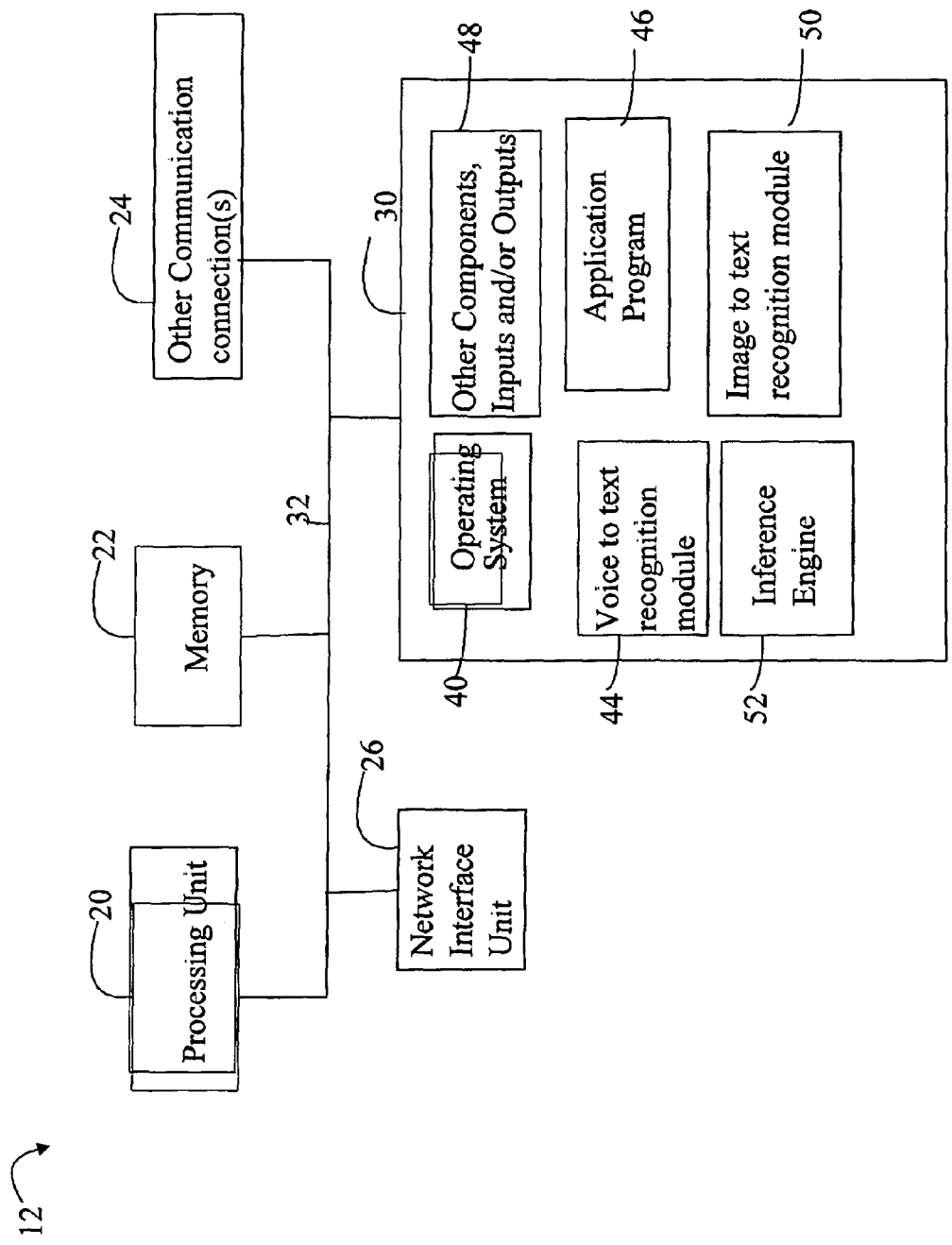
FIG. 2 is an example of components that may be included in an embodiment of a device for use in connection with performing the techniques described herein.

Referring now to FIG. 2, shown is an example of components that may be included in the device 12 as may be used in connection with performing the various embodiments of the techniques described herein. The device 12 may include one or more processing units 20, memory 22, a network interface unit 26, storage 30, one or more other communication connections 24, and a system bus 32 used to facilitate communications between the components of the device 12.

Depending on the configuration and type of user device 12, memory 22 may be volatile (such as RAM), non-volatile (such as ROM, flash memory, etc.) or some combination of the two. Additionally, the device 12 may also have additional features/functionality. For example, the device 12 may also include additional storage (removable and/or non-removable) including, but not limited to, USB devices, magnetic or optical disks, or tape. Such additional storage is illustrated in FIG. 2 by storage 30. The storage 30 of FIG. 2 may include one or more removable and non-removable storage devices having associated computer-readable media that may be utilized by the device 12. The storage 30 in one embodiment may be a mass-storage device with associated computer-readable media providing non-volatile storage for the device 12. Although the description of computer-readable media as illustrated in this example may refer to a mass storage device, such as a hard disk or CD-ROM drive, it will be appreciated by those skilled in the art that the computer-readable media can be any available media that can be accessed by the device 12.

By way of example, and not limitation, computer readable media may comprise computer storage media and communication media. Memory 22, as well as storage 30, are examples of computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by device 12. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The device 12 may also contain communications connection(s) 24 that allow the computer to communicate with other devices and components such as, by way of example, input devices and output devices. Input devices may include, for example, a keyboard, mouse, pen, voice input device, touch input device, etc. Output device(s) may include, for example, a display, speakers, printer, and the like. These and other devices are well known in the art and need not be discussed at length here. The one or more communications connection(s) 24 are an example of communication media. In one embodiment, the device 12 may be connected to a touchscreen display as a user interface. As known in the art, a user selection may be made using a touchscreen device by touching a location on the screen or display surface. The foregoing may be used, for example, as an alternative to obtaining user input with another input device such as a mouse, keyboard, and the like.

In one embodiment, the device 12 may operate in a networked environment as illustrated in FIG. 1 using logical connections to remote computers through a network. The device 12 may connect to the network 14 of FIG. 1 through a network interface unit 26 connected to bus 32. The network interface unit 26 may also be utilized in connection with other types of networks and/or remote systems and components.

One or more program modules and/or data files may be included in storage 30. During operation of the device 12, one or more of these elements included in the storage 30 may also reside in a portion of memory 22, such as, for example, RAM for controlling the operation of the user computer 12. The example of FIG. 2 illustrates various components including an operating system 40, one or more application programs 46, a voice to text recognition module 44, an image to text recognition module 50, an inference engine 52, and other components, inputs, and/or outputs 48. In one embodiment, the application program 46 may be a web browser, a client-side application, or other application used when operating the device 12 standalone and/or with external connectivity.

The voice to text recognition module 44 may be used in connection with the techniques herein to perform voice to text recognition of captured information. The image to text recognition module 50 may also be used in connection with the techniques herein to perform image to text recognition. The inference engine 52 may be used in connection with automating the performance of actions based on inferences that may be drawn from captured information. The use of these and other components are described in more detail in following paragraphs.

As will be set forth in following paragraphs, techniques are described herein for use in connection with capturing information using a capture device and using such captured information in connection with performing one or more actions. The captured information may include audio, image and/or video data stored in one or more different forms. In one embodiment, the different types of captured information may be represented and stored in a file format. For example, captured audio information may be stored and represented in an audio file format, captured information which is a combination of audio and video information may be stored as in a file format used to represent multimedia data, and the like. The captured information may be used in connection with performing actions associated with one or more target websites, applications, services, and the like. For example, the captured information may include audio information. A user may capture a voice recording as the audio information to be used in forming search queries. The image capture may occur using the capture device which is offline, or otherwise not connected to, a computer or other device having connectivity to a search engine which utilizes the captured information in performing search queries. At a later point, the user may connect the capture device to a computer or other device having connectivity to a search engine. The captured audio information may be stored on the capture device in digital form in an audio file format. Using techniques described herein, the audio information represented as an audio file may be downloaded to the computer. The captured audio information may be represented or converted to a text string using the module 44. The text may be used in connection with performing a search query. Similarly, if the captured data is image data in an image file format, the captured image information may be downloaded to the computer and converted to text using module 50. The captured information represented as text may be used in connection with performing the queries. The inference engine 52 may be used in connection with automating performing an action by inferring an action in accordance with captured information. As described herein, such inferences may be based on the use of keywords, syntactic and contextual rules, data typing, and the like. Also using techniques described herein, the captured information may be stored in a catalogue or database of captured information associated with a particular user. A variety of different operations, such as offered in connection with an aggregation service, may be performed using the captured information with techniques described herein. The foregoing is described in more detail elsewhere herein.

It should be noted that the components 44, 50, and 52 are illustrated in the exemplary embodiment of FIG. 2 as stored and executed on the device 12. As will be appreciated by those skilled in the art in light of the description in following paragraphs, one or more of these components may be included in the server 15 with the associated processing of the components performed by the server 15 and/or the device 12 in alternative embodiments.

The device 12 may include one or more ports for use in connection with external devices. In one embodiment, the device 12 may be a computer and include one or more ports, such as USB ports, for use with other devices, such as USB devices. Such a device may be characterized as an audio and/or image capture device that can perform audio and/or image capture. Additionally, the USB device may also be used as a storage device.

The operating system 40 may be any one of a variety of commercially available or proprietary operating systems. The operating system 40, for example, may be loaded into memory in connection with controlling operation of the user computer. One or more application programs 46 may execute in the device 12 in connection with performing user tasks and operations.

Figure 3:
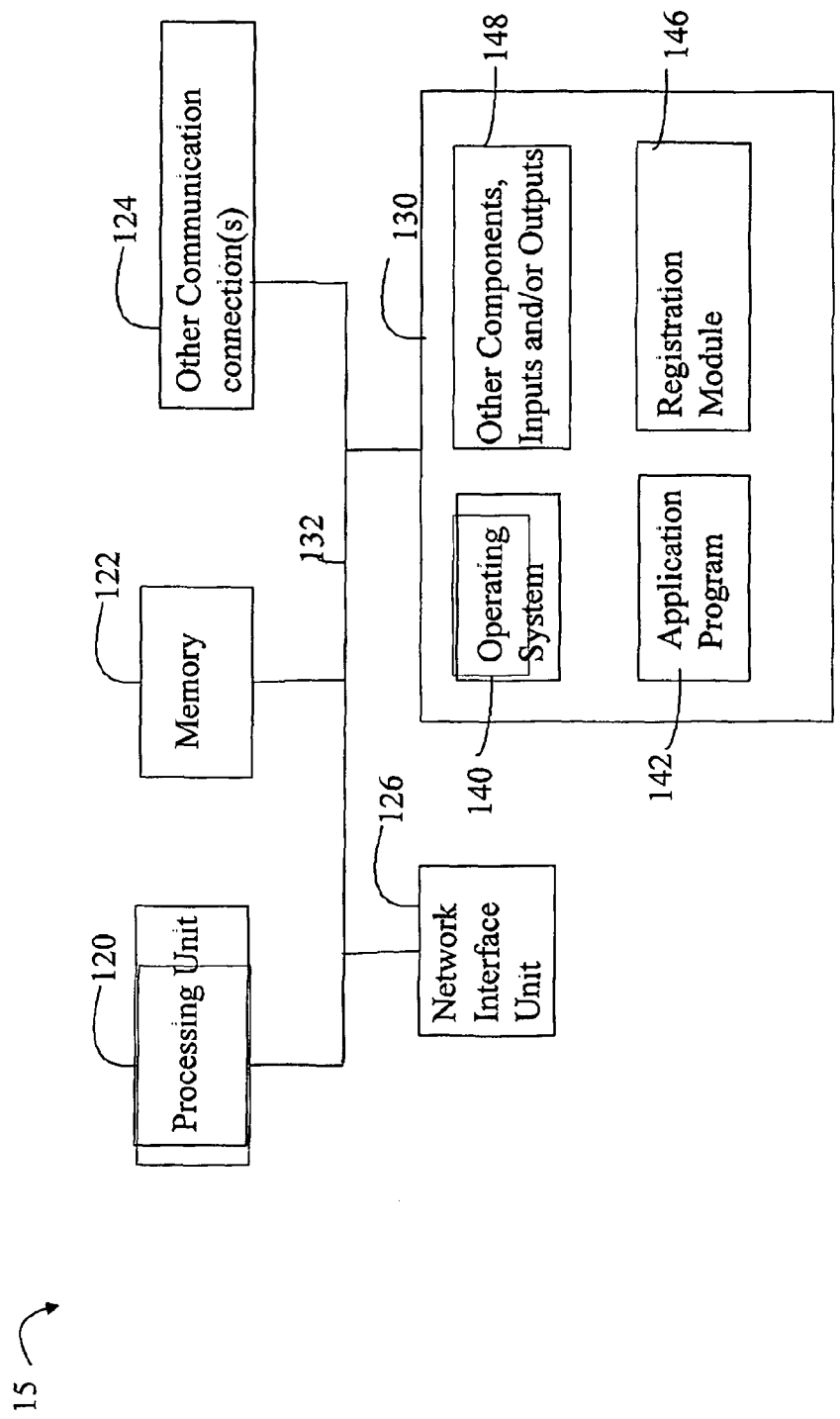
FIG. 3 is an example of components that may be included in an embodiment of a server.

Referring now to FIG. 3, shown is an example of components that may be included in the server 15 and used in connection with performing the various embodiments of the techniques described herein. As illustrated in FIG. 3, an embodiment of the server 15 may include components similar to those described in connection with FIG. 2. Additionally, the server 15 may include a registration module 146 for registering one or more users of the server. In one embodiment, a user of the device 12 may be registered. In connection with techniques herein, each user may have an electronic email account, a calendar, and the like. Information for each of the foregoing may be maintained at the server 15. The registration module 146 may be used in connection with registration of a user. As part of the registration process, the user may be assigned a user identifier, an associated email account, and the like. In order to access the server 15 and/or utilize components and services included thereon, a user may provide authentication information associated with a particular account for the user. A user may also be registered to use one or more services, such as the aggregation service providing services in connection with captured information, described in more detail in following paragraphs.

The server 15 may also include one or more applications 142, such as client-side applications, which may be accessed and executed when device 12 is connected to the server 15. The application 142 may perform, for example, a service, for a registered user of a connected device 12. In one embodiment, the server may include an aggregation service which performs one or more services in connection with aggregation and storage of captured information. Such captured information may be stored on the server 15 and associated with a particular user account of a registered user. The service may provide functionality for performing management operations using the captured information, such as for sorting, organizing, and editing captured information. The service may be used in connection with performing one or more actions, such as performing a search query, using the captured information. In connection with performing the action, the inference engine 52 may be utilized. The aggregation service as well as performing actions in connection with captured information is described in more detail in following paragraphs.

Figure 4:
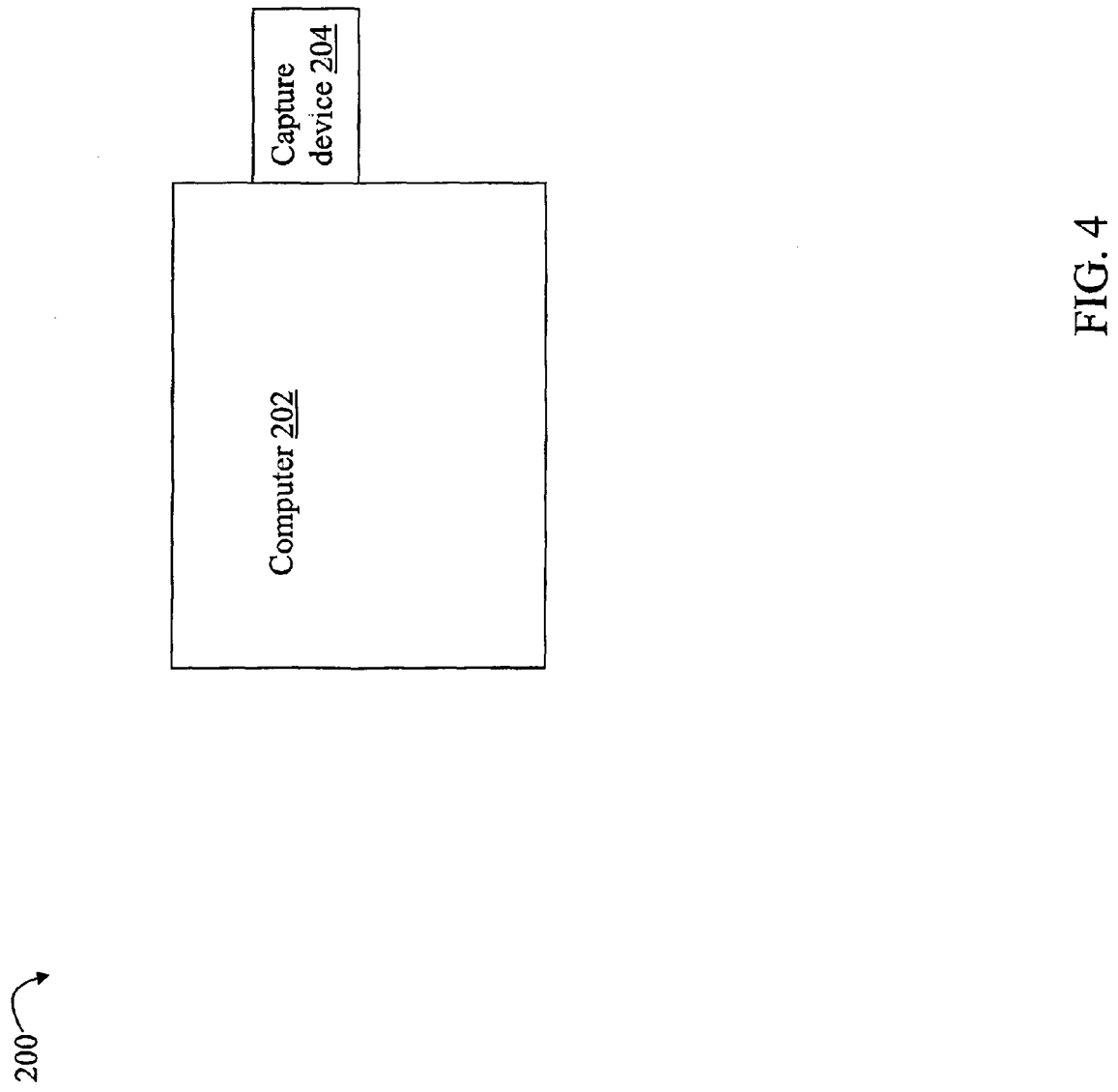
FIG. 4 is an example of components that may be included in an embodiment of a device and associated capture device for use in connection with performing the techniques described herein.

Referring now to FIG. 4, shown is an example illustrating a computer 202 and a capture device 204. A capture device, as mentioned above, is illustrated in FIG. 4 as element 204. The capture device 204 may perform audio and/or image capture. The captured information may be represented in a form and stored on the capture device 204. The captured information may subsequently be downloaded to a device 12, which in this example is the computer 202, for further processing.

As described in more detail elsewhere herein in one embodiment, the capture device 204 may be a USB device. Examples of the capture device 204 and techniques that may be used in connection therewith, are described in more detail in TECHNIQUES FOR AUDIO AND IMAGE CAPTURE, filed on even date herewith, application Ser. No. 11/650,905, which is incorporated by reference herein. The capture device 204 may include functionality for performing audio and/or image capture. The capture device 204 may perform the audio and/or image capture in a standalone mode when the device 204 is not connected to another device, such as the computer 202. The capture device 204 may also perform the audio and/or image capture when the capture device 204 connected to another device, such as the computer 202. The captured audio and/or video information may be stored on the capture device 204. The captured information may be downloaded to the computer 202 when the capture device 204 is connected to the computer 202, such as when the capture device 204 is inserted into a communications port of the computer 202. As will be described in more detail herein, such downloading of the captured information may occur using an automated technique as well as using non-automated techniques.

In connection with the techniques herein, any one of a variety of different capture devices may be used. For example, the capture device may include components to perform audio and/or image capture. Such components may include a microphone, camera, and other components to capture and store captured information in a form on the capture device. For example, the capture device may store captured information in the form of a digital representation as a file. The image capture may be for a single image as well as a multiple images, such as those comprising a video clip. The video clip may include audio as well as image information. The capture device may also include a form of non-volatile memory, such as flash memory, upon which the captured information is stored. In one embodiment, the capture device may be a USB flash memory drive having additional components to perform image and/or audio capture. It should be noted that although an exemplary capture may be a USB device, it will be appreciated by those skilled in the art that the functionality described herein may be used in connection with other types of devices and is not limited for use with USB devices.

In one embodiment, the captured information in the form of one or more files may be stored in a predetermined location on the capture device. For example, audio information captured and represented as an audio file may be stored in a default directory, folder, file, and the like, on the capture device 204. Depending on the capture device, additional information may also be stored with the captured information. The additional information may include metadata, for example, about captured audio information. For example, in one embodiment, metadata may include date and/or time information as to when the audio information is captured.

The capture device may be used in connection with capturing audio and/or image information in a first standalone or offline mode. The capture device may be used, for example, in recording audio and/or image information throughout the day. At a later point, the user of the capture device may download the captured information to another device, such as a computer, for further processing. In connection with a second mode of use of the capture device, the capture device may be connected to another device, such as the computer 202 described elsewhere herein. In this latter case, the capture device may be used in connection with capturing information, such as an audio recording, while also being connected to the computer 202. In this case, the captured information may be downloaded to the computer 202 as soon as capture of the information is complete, or as the information is being captured.

The capture device may be configured to facilitate downloading of captured information to another device. In connection with the first standalone or offline mode, the capture device may be configured to facilitate automated download of previously captured information when the capture device is inserted into a port of another device, or in response to another action in connection with commencing communication with another device. In connection with the second mode when information is captured while the capture device is connected to another device, the captured information may be automatically downloaded to the other device. The captured information may be downloaded to a predetermined location on the other device, such as a file, folder, directory, and the like. The captured information may also be downloaded to another network location, such as to a server connected to the other device as illustrated in FIG. 1.

The captured information may be downloaded from the capture device using a variety of different techniques that may vary with the type of other device including the capture device. The capture device may be inserted into a port of another device, such as a computer. Processing may be performed by the other device to facilitate downloading of the captured information to the other device. What will be described is an exemplary embodiment in which the other device is a computer and the capture device is a USB device inserted into a USB port of the computer. However, the techniques described herein may be performed with respect to other devices to which a capture device is connected as well as other types of capture devices. The techniques described may utilize an event driven model. In one embodiment, a technique may be used which utilizes functionality in the operating system of the computer to present an option to a user on a menu in response to insertion of the capture device. When the USB device is inserted into the port of the computer, the USB device may identify itself via its USB descriptor as a CDROM device to utilize automated functionality in the operating system. When the USB device that identifies itself as a CDROM device is brought online, the operating system performs processing to look for a particular file or application in a predetermined location on the USB device. If such a file or application exists in the predetermined location, the operating system automatically includes the file or application in a menu of options presented to the user. The user may then select from the menu the file or application which is then launched for execution. Thus, the foregoing technique may be used to invoke an application or file on the USB device itself.

In an embodiment, another technique may be used to invoke an application on the computer or other device to which the capture device is connected. An application on the computer may be registered to receive notification of certain events, such as notification of when the USB device is inserted into the computer. The notified application may then perform processing to facilitate downloading the data from the capture device. For example, based on the USB descriptor identifying the USB device as a CDROM, the operating system may launch an associated application or service. The associated application may be a web browser used to obtain credential information and log into a server on the network. Processing may then be performed to download the captured information from the capture device to the server connected to the computer.

The foregoing provides for techniques that may be used in connection with automating the download of captured information from a capture device. An embodiment may additionally, or alternatively, include functionality for a manual mode of downloading the captured information without such automated processing when the capture device is connected to the computer. For example, the captured data may be downloaded from the capture device 204 to the computer 202 by having a user initiate the captured information download such as by issuing the commands for copying the captured data from the USB device to another user-specified location, user specified application, and the like. Additionally, the foregoing techniques may be used in an embodiment in which the computer or other device is connected to a network, as described above, or when the computer or other device operates standalone without such connectivity, such as when performing processing locally on the device to which the captured information is downloaded.

The captured information may be used in connection with any of a variety of different purposes and applications. For example, the capture device may be used in connection with capturing information for a variety of user tasks when the user may be offline or not have connectivity to the particular application or another device, such as a computer, which utilizes the captured information. The capture device may be used to capture information ranging from, for example, user search queries, a grocery list, daily food intake or exercise log, dictation of electronic documents, email, electronic calendar or appointment data, and the like. The captured information may include audio and/or image information.

Subsequent to the downloading of the captured information, processing may be performed of the captured information to place the information in a form usable with a particular application. For example, captured audio information of a voice recording may be converted to text via the voice to text recognition module 44 on a computer. The text may serve as input for use with any one of a variety of different actions such as, for example, invoking a search query engine and performing a search query, invoking another application or service and providing input used with the application or service, logging into an account at a website location and posting information to the website, and the like. If the captured information is a single image and a text string is needed, for example, to form a search query, pattern recognition processing may be performed using the image to text recognition module 50 to generate a text string for text included in the image.

The capture device may also be used as a mass storage device. As described herein, the captured information may be read from the capture device. Furthermore, data may be subsequently written to the capture device, for example, for subsequent use and retrieval by the device 12 or another device. The data written to the capture device may relate to the captured information. For example, after performing a search using a search query formed using data from the capture device, the search results may be stored on the capture device and associated with the corresponding search query. The capture device may also be used as a storage device to store any data thereon including data which may be characterized as not related to the captured information.

It should be noted that rather than utilize a capture device 204, other techniques may be used in connection with obtaining and storing captured information. Audio and/or image data may be stored in another location on the computer 202 or other storage device connected thereto and also used in connection with the processing techniques described herein for the captured information.

It should be noted that the capture device may also be incorporated as an integrated component of another device. For example, a computer may include a capture device as an integrated component in a keyboard, laptop cover or bottom, and the like.

Figure 5A:
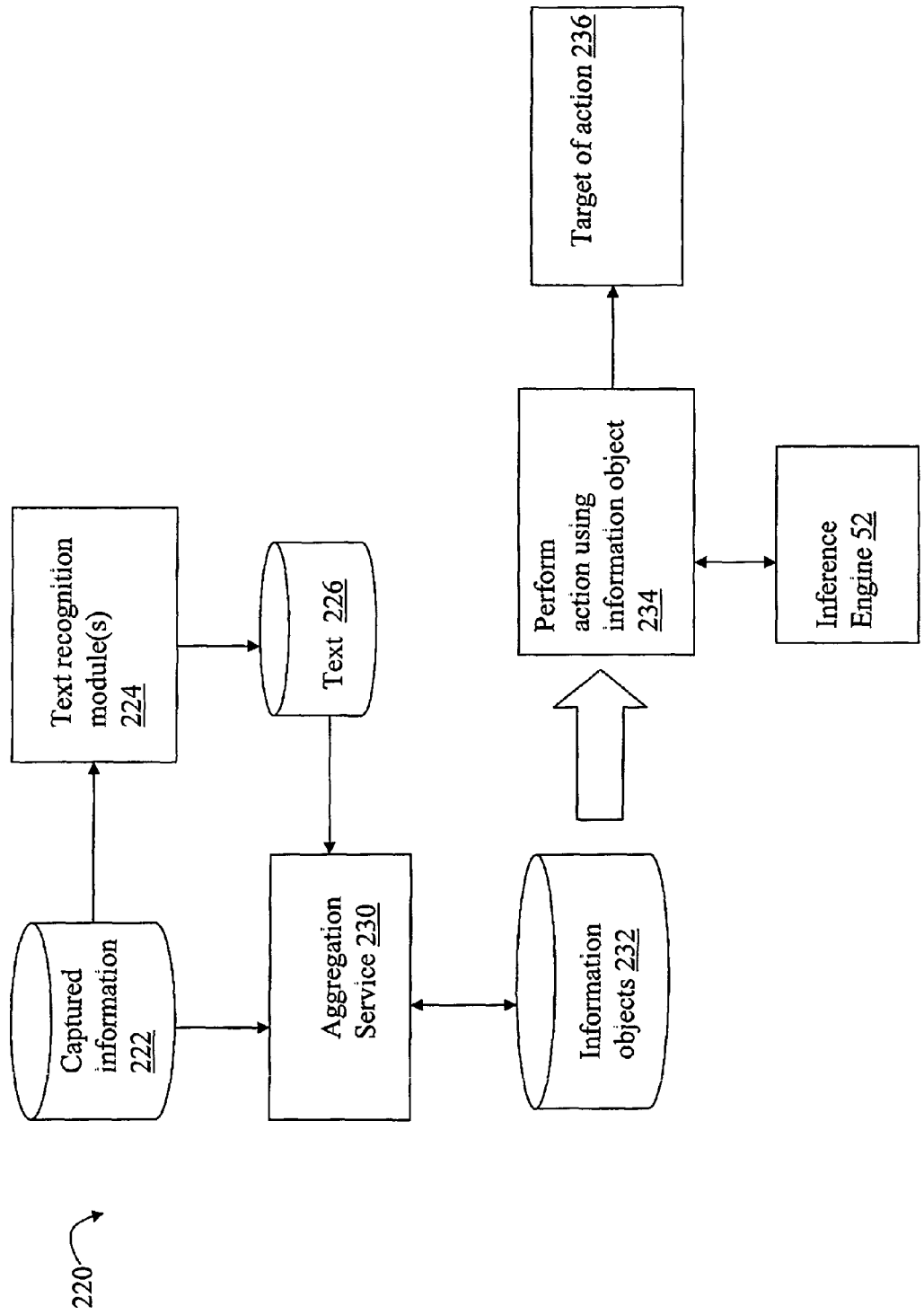
FIG. 5A is an exemplary embodiment of a block diagram of components that may be used in connection with the techniques herein.

Referring now to FIG. 5A, shown is an example of a block diagram illustrating data flow between components that may be included in an embodiment. The captured information 222 may be the captured audio and/or image data storage in any one of a variety of different formats, locations and the like. In connection with one embodiment described herein with the capture device 204, the captured information 222 may be stored in one or more files on the capture device. As also described herein, such captured information may be downloaded to the computer or other device. Once the captured information is downloaded, the captured information 202 may be converted to text using one or more text conversion modules 224 that may reside on the computer. The modules 224 may include, for example, modules 44 and/or 50 as illustrated in FIG. 2. As output for each portion of captured information 222, the modules 224 generate text 226. In one embodiment, a text string may be output for each file (e.g., audio, image, video, and the like) of captured information. In an embodiment, it should be noted that in the instance where the captured information is a multimedia file including an audio and image component, the audio information may be converted to text.

The aggregation service 230 may be a service offered by the server 15. The aggregation service may provide services in connection with aggregating and storing the captured information 222, text 226, and other data about the captured information. For example the aggregation service 230 may perform processing for management of the aggregated captured information, facilitating use of the captured information with one or more actions, and the like. For each portion of captured information stored in each file, the aggregation service 230 may create a corresponding information object. The information objects 232 may be stored on the server 15 in one embodiment. The service 230 may provide one or more processing operations in connection with managing the information objects, invoking actions utilizing the captured information represented by the information objects, and the like.

In one embodiment, when the captured information is downloaded to a computer, a web browser may be launched to prompt the user for an account and other authentication information to log onto the server 15. The web browser may be launched using one or more of the automated or manual techniques described herein. Once the user has logged on to the server 15, the aggregation service may perform processing on the captured information which is downloaded from the capture device. In one embodiment, a client component of the aggregation service 230 may reside on the computer 202 and control the download of information from the capture device to the computer as well as initiate any conversion to text. The client component of the aggregation service 230 may communicate with a server component to transmit the captured information 222 and associated text 226 for storage at the server. The aggregation service 230 may form an information object for each file of captured information. The information object is described in more detail elsewhere herein. The formation of the information objects may be performed using the client and/or server components of the aggregation service 230 so that the information objects 232 are formed, stored on the server, and available for use by the computer 202 in connection with the techniques herein. Once the information objects 232 for the captured information 222 are formed, one or more selected information objects can be used to perform one or more actions 234 using a selected information object. Selection of the information objects and launching of the action may be facilitated using the aggregation service and user interface as illustrated and described elsewhere herein.

The actions may be performed with or without using the inference engine 52. In one embodiment, automated action selection may be performed using the inference engine 52 to infer which action to take. The aggregation service 230 may communicate with the inference engine 52 when automated action selection is enabled. In connection with automated action selection, the inference engine 52 may utilize rules or templates to specify patterns of particular actions to be recognized. The inference engine 52 may parse the text 226 and perform recognition processing in accordance with specified patterns indicating the particular actions. If the text of an information object is in accordance with a pattern, an action denoted by the pattern may be inferred and the action may be performed. An embodiment may also include a non-automated action selection mode in which the inference engine may not be utilized. Rather, an action may be initiated in accordance with a user initiating selection of an action, for example, using input device to select an option from a displayed menu. Use of the inference engine 52 is described in more detail elsewhere herein.

Once an action is selected, communications with a target 236 associated with the action may be performed. For example, an action may include launching an application on the server 15, an application on the computer 202, communicating with a website, and the like.

In order to illustrate the techniques herein, an example will now be described in which a user may capture audio recordings for use in connection with performing search queries. However, the particulars of this example provided for purposes of illustration should not be construed as a limitation of the techniques herein.

A user may perform tasks throughout the day at various times when he/she does not have access to a computer or other device having a searching functionality. The user may capture his/her queries throughout the day as voice recordings on a capture device. The capture device may be, for example, capable of capturing audio or voice and/or image information. When the user arrives at home or another destination having a computer with searching capabilities, the user may connect the capture device to the computer having searching capabilities (e.g., access to a search engine). The queries may be downloaded from voice recorder or other capture device used to capture the user's queries. In one embodiment in which the capture device performs audio capture, the user's various queries recorded throughout the day may be downloaded to the computer using techniques described herein.

Each captured audio recording may be stored as an audio file. Each audio file may be interpreted as a distinct query. An audio recording may be represented as the audio information captured during when the user starts and stops audio capture. The next time audio capture is restarted delimits the beginning of a subsequent audio recording and audio file.

As the captured audio information is downloaded to the computer, the captured audio information may be automatically converted to text. A screenshot presented to the user may be populated as the converted text is obtained. An example of such a screenshot is described in following paragraphs and figures. Also, as the converted text is obtained, the text and associated audio file may be sent to the server 15. The aggregation service 230 may create an information object corresponding to the text and associated audio file and store the information object on the server 15. It should be noted that an embodiment may also obtain additional information from the captured information. Such additional information may include, for example, metadata such as time/date information as to when the audio capture occurred. In this embodiment, the converted text corresponding to the captured audio information is used in connection with search queries. As such, the screenshot may display the converted text in the context of search queries.

Figure 5B:
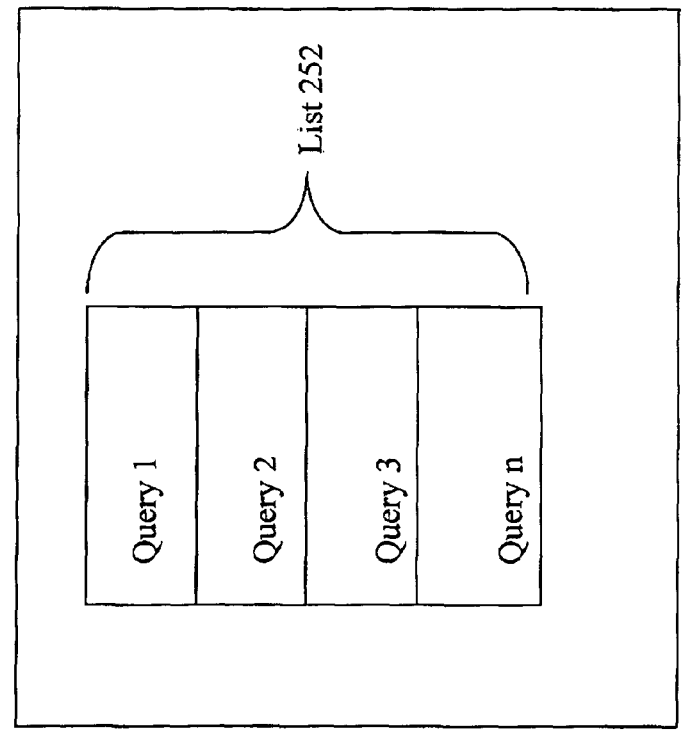
FIGS. 5B, 6A, 6B and 7A are examples of screen shots that may be displayed in connection with performing the techniques herein.

Referring now to FIG. 5B, shown is an example of components that may be included in a screenshot as the converted text is determined for the captured audio information. The screenshot 250 may represent a user interface presented on the device 12 for a registered user of the aggregation service 230. The example 250 may include a list 252 of one or more queries. Each element of the list 252 may correspond to a single audio recording represented as a single audio file. Each element of the list 252 may correspond to an information object for a portion of captured information. It should be noted that although the list 252 in this example is illustrated as a list of queries, the list 252 may generally be described as displaying information included in the information objects. The way in which the information object is processed varies in accordance with the selected action.

Figure 6A:
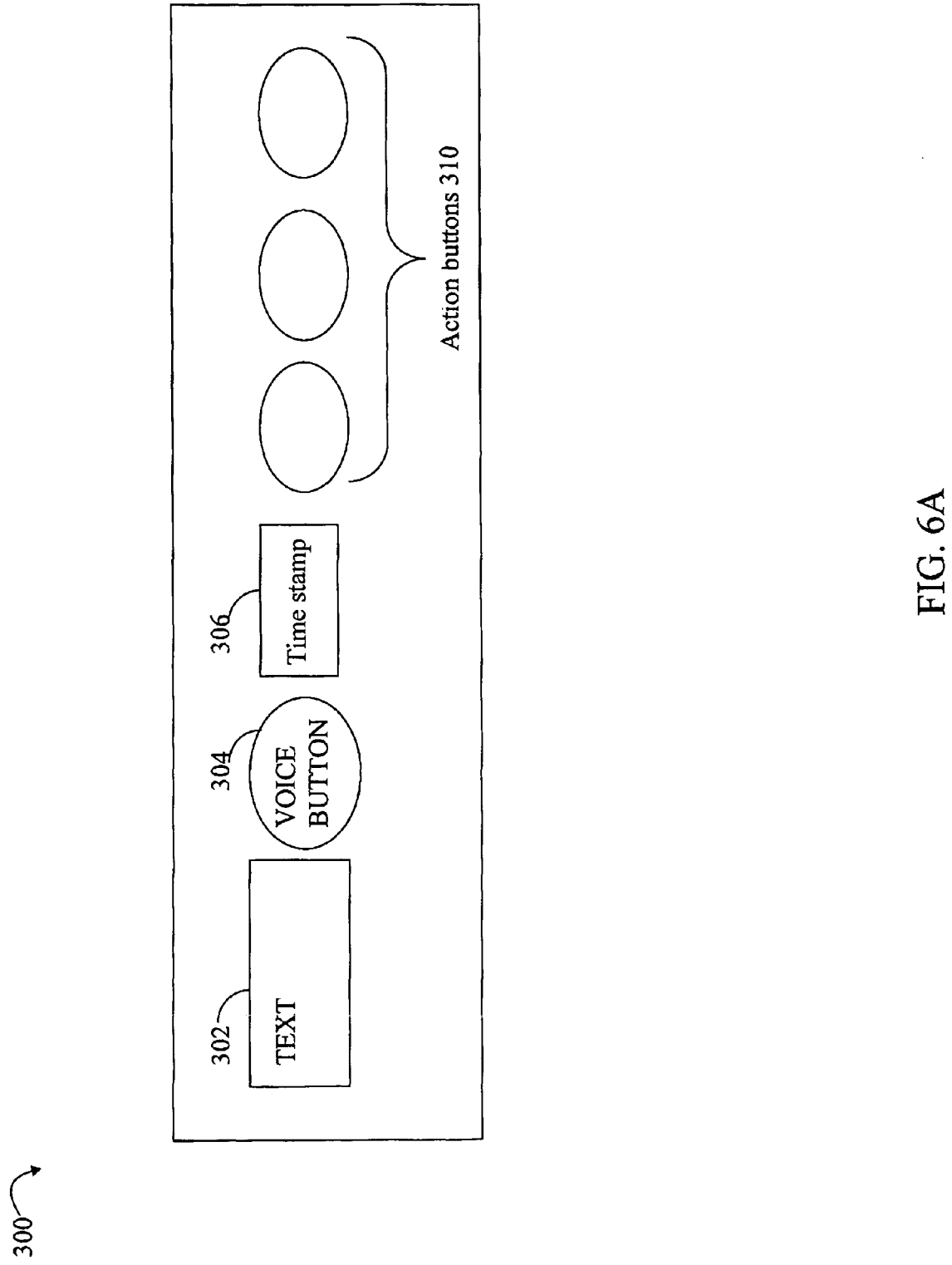

Referring now to FIG. 6A, shown is an example 300 illustrating in more detail how each information object or element of the list 252 may appear on the display. The information object in the example 300 may include the converted text 302, a voice button 304, a time stamp 306, and one or more action buttons 310. The text of 302 may be initially generated by the module 44. The voice button 304 may be selected in order to play the audio file of captured audio information. In other words, selection of the button 304 may play back the captured audio information as used to determine the text of 302. The button 304 may be associated with a path of the audio file representing the captured audio information. The user may edit the text in 302, for example, in revising the query since the text conversion modules may have incorrectly interpreted the captured audio information. It may be useful to playback the captured audio information in connection with performing such editing. The time stamp 306 may include the time and/or date information if available for the captured audio information. The time stamp 306 may be determined using the metadata stored with the captured audio information. The one or more action buttons 310 may correspond to actions that may be performed using the captured information represented in the text of 302. In one embodiment, an action button in 310 may cause a search to be performed using a specified search engine with the text of 302 as the search query terms. It should be noted that although the search option is selected in this example, the action buttons may include other actions as will be described in more detail. The contents of 302 may be processed in accordance with the selected action.

It should also be noted that although audio recordings are used in this example, the text of 302 may be derived from an image file. In such an instance, rather than the voice button 304, the display may include a button to retrieve and render the image file.

Figure 6B:
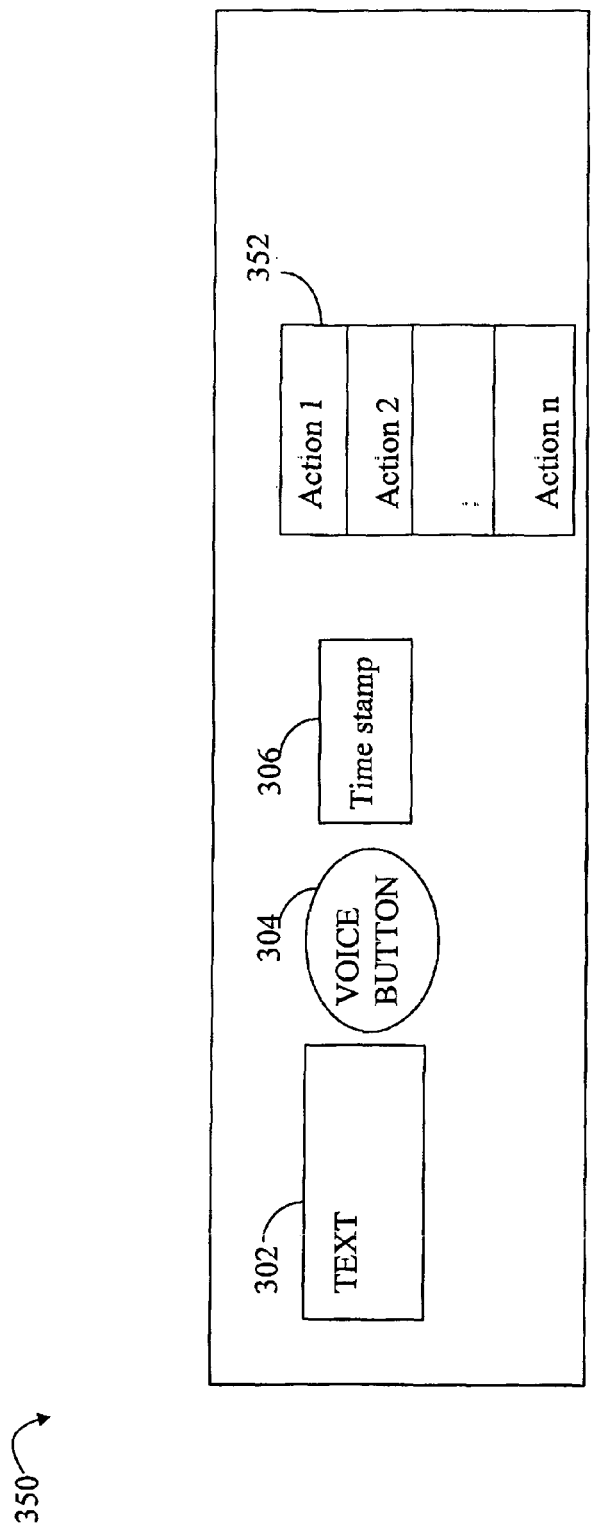

Referring now to FIG. 6B, shown is another example 350 illustrating in more detail how each information object or element of the list 252 may appear on the display. Note that the example 350 includes elements similar to those illustrated in the example 300 of FIG. 6A. In the example 350, the actions that may be selected may be displayed in a drop down list 352 rather than as buttons 310 in FIG. 6A. Other embodiments may include other representations of the available actions than as illustrated herein for exemplary purposes.

In this example for purposes of simplicity, the inference engine is disabled and no inferences are drawn from the captured information. In order to perform an action, a manual selection of an action may be made using an action button from 310 of FIG. 6A or from the list 352 of FIG. 6B.

Alternatively, an embodiment may specify a default action to be automatically performed using the text 302 as the converted text 302 is obtained for each portion of captured information. In one embodiment, a global option may be specified to perform the same action for such text portions. An embodiment may also utilize the inference engine to determine which action to take for each particular information object. As described herein, such action may be determined based on inferences drawn from the text of the text field 302. From a user's perspective in one embodiment utilizing functionality to facilitate automated download of the captured information from the capture device and also utilizing the automated action selection, inserting the capture device may initiate the following in an automated fashion with little or no user input needed: download of captured information, conversion of the captured information to corresponding text, and performing a search query using the initial corresponding text. The inference engine may be used to provide automated action selection as an alternative to manually selecting an action as described above.

Whether the manual or automated action selection is used, results of the one or more queries performed are displayed when a search query is selected as the action taken.

Figure 7A:
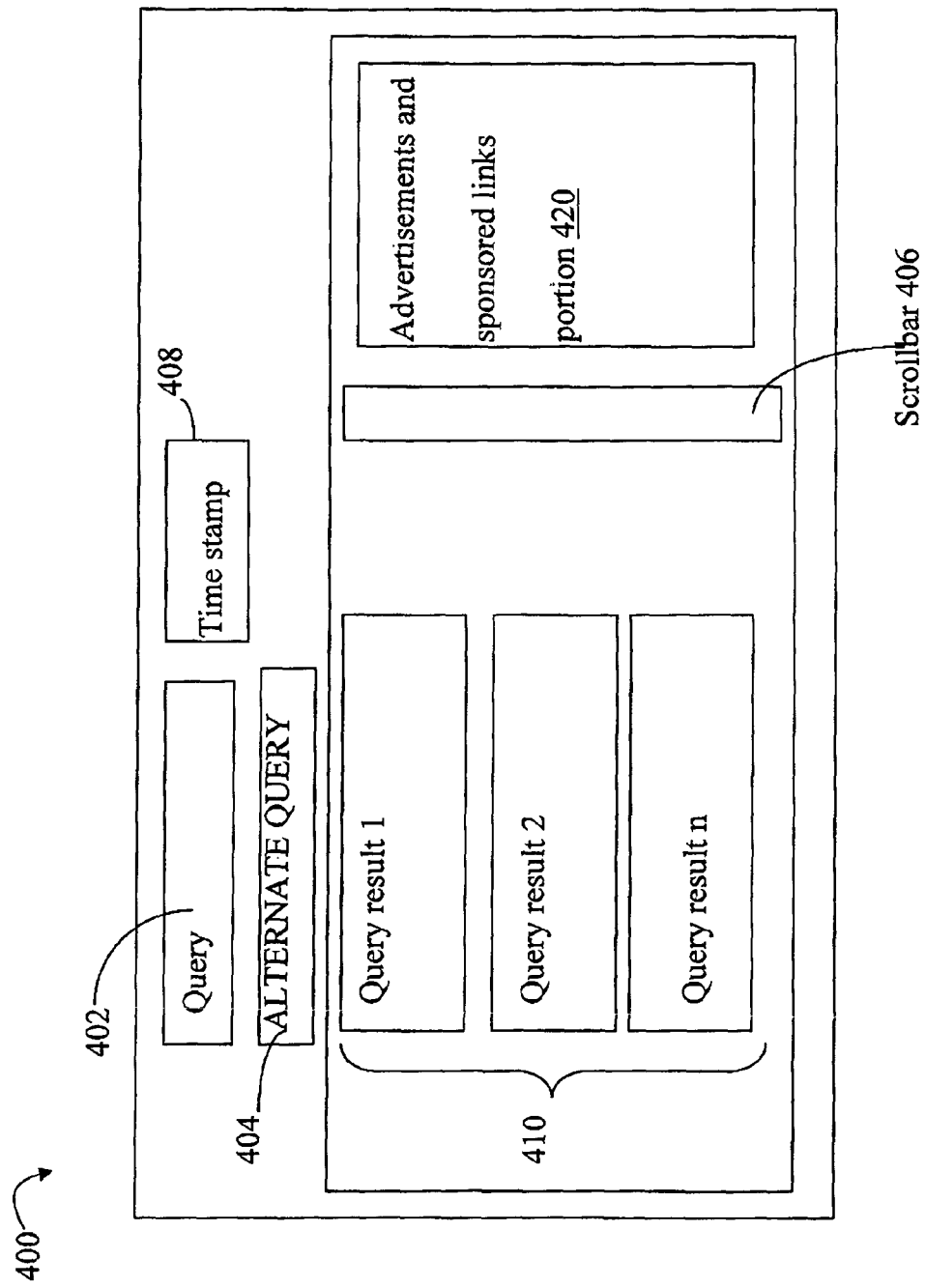

Referring now to FIG. 7A, shown is an example of a screenshot that may be used to display search results using the techniques herein. The screenshot 400 may be displayed in connection with the user interface of the aggregation service 230. The example 400 may be displayed in response to selecting a search action causing an initial search to be performed. In one embodiment, previous search results for each search query may be stored and also be associated with the search query. The previous results may be linked to the search query and obtained, for example, by selecting another action from a user interface, such as illustrated in FIG. 6A and FIG. 6B.

The example 400 includes the search query 402, an alternate query 404, a time stamp 408, the query results 410, a scrollbar 406 and a portion 420 of advertisements and sponsored links. The query 402 may include the portion of the converted text, for example, as included in field 302. The time stamp 408 may include the time stamp information of when the query was performed to obtain the results of 410. The element 410 corresponds to the query results. The content and format of 410 may vary with the particular search engine used. In one embodiment, each element of 410 may correspond to a single Internet page including results corresponding to the query 402. The scrollbar 406 may be used to scroll the display 400 in the event the query results spans more than one screen display. Portion 420 may include advertisements, links to advertising sponsors, and the like, also selected in accordance with the query 402. An alternate query may be included in area 404, for example, to suggest possible alternative queries. As known in the art, the query 402 may be processed to detect possible alternatives to selected terms. The possible alternatives may be based on spellings similar to a term of 402 as well as other processing techniques that may be included in an embodiment.

The aggregation service described herein may cause each query and associated search results, or other action results, to be catalogued on the server 15. The action results may be associated with the information object used to perform the query. A user may then perform operations using the various recorded information objects, associated action results, and the like. For example, a user may display information objects corresponding to captured information obtained over a time period. The user may select to display particular information objects in accordance with specified criteria such as information objects having particular capture or download dates, information objects and/or action results associated with particular topics, and the like. The aggregation service may allow the user to edit the text of stored information objects, delete information objects, and other operations in connection with managing information objects such as those corresponding to captured information. As newly captured information is downloaded, the captured information is processed and added to the data stored at the server 15 by the aggregation service. The aggregation service may include functionality allowing a user to group information objects corresponding to captured information in a hierarchical or other organizational structure, for example, using files, folders, directories and the like. For example, information objects used in connection with queries may organized into query groups such as home queries work queries, and the like, based on some user-specified criteria.

As described herein, the captured information may be in any one of a variety of different forms. The actions may also be presented in an interface in any one of a variety of different displays. An embodiment may include actions which may result in invoking a particular application, communicating with a website and the like. An embodiment may include actions, such as, for example, to perform a search of webpage content or files, perform a social search, perform a URL search, invoke an electronic mailing application to create and send an email, create and send an instant message, create or modify an electronic phone or address book entry, post captured information as represented in its initial captured form (e.g., an audio file, image file, and the like) and/or corresponding text to a website location, such as a blog, post information to a website location using an account or identity associated with a user, create or modify electronic calendar and appointment information, and the like. In connection with invoking an application or posting information to a website, the action may be related a variety of different areas. For example, the techniques herein may be used to post captured information corresponding to movies to an account where movie rental requests are queued (e.g., Netflix), download shopping list information to an application, download personal meal tracking information to a website or application, download financial information, exercise or other personally recorded data, and the like. The foregoing are some examples of the general applicability of the techniques herein and are not limited to those presented for purposes of illustration.

It should be noted that a social search may be characterized as posting a query, note, or other information to a website having an online community for comment or other response. For example, rather than perform a query using a search engine, a user may post a question using text and/or image and/or audio information at an Internet site expecting a reply from another who may also visit the same site. When a response to a question is posted, an email or other electronic notification may be sent to the user. As another example, a user may use the capture device to record a song snippet and post the sound snippet along with a text portion requesting information about the song. Similarly, a user may capture image information and post the image information in the form of an image file along with a text portion requesting information about the image.

As described herein, action selection may be automated using the inference engine. The inference engine may be used in connection with interpreting the converted text corresponding to captured information. The inference engine may draw inferences with regard to an action to take based on, for example, keywords, syntactic or other patterns and data formats, and the like. The inferences may be specified using any one of a variety of different techniques including, for example, rule specifications defining the patterns, keywords, and the like. As one example, the text portion may be analyzed to determine whether the text includes numeric data in the format of a telephone number, alphanumeric data corresponding to an address, date, and the like. Inferences may be determined using keywords. In such instances, a user may provide different capture information for use in connection with automated action selection than in connection with manual or non-automated action selection.

As a further example to illustrate inferences for a selected action that may be drawn based on data patterns, parsing may be performed to determine if the converted text portion corresponds to the following:

<text string> <phone number>

If so, further processing may be performed to determine if the <text string> corresponds to an existing name in an address book. If so, the inferred action may be to modify or add the <phone number> to the address book entry for the existing name corresponding to <text string>.

In one embodiment, the converted text portion may include keywords. For example, in connection with an email application, the following use of keywords and format may be used to infer an action resulting in invoking the email application, and creating and sending an email message. Suppose the converted text portion corresponds to the following:

EMAIL TO <NAME> <message body>

Keywords may be used to denote that the captured information corresponds to an email message using the keyword EMAIL. Keywords may also be used in connection with denoting the particular parameters such as, for example, TO indicates that the email message is sent to another email user designated by <NAME>. Alternatively, an embodiment may not require use of keywords other than the EMAIL keyword. Rather, by the position of the <NAME> parameter, it may be presumed that <NAME> indicates to whom the email message is sent.

Similarly, keywords specified as the first word of the converted text may be used to indicate other actions such as, for example, "IM" for sending an instant message, "ADDRESS BOOK" to indicate specifying an address book entry or modifying an existing entry, and the like. The remaining or subsequent portions of the converted text may be interpreted in light of the particular inferred action.

Figure 7B:
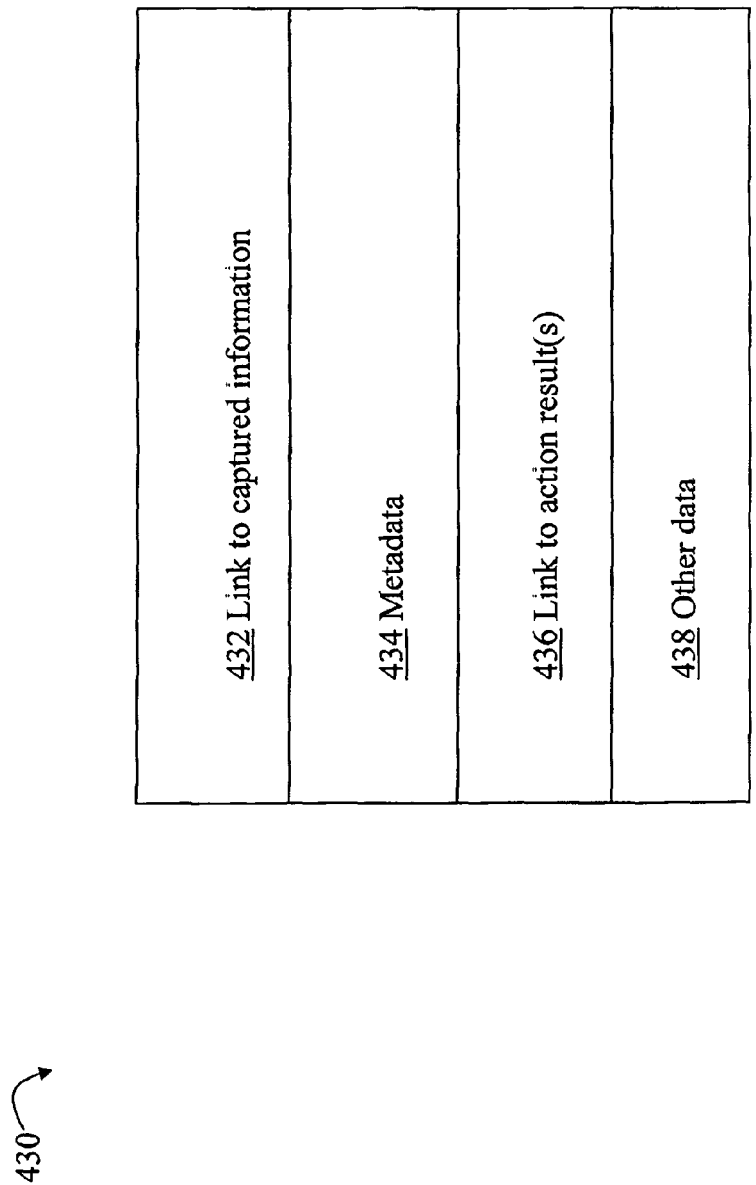
FIG. 7B is an example representation of an information object as may be stored on a server included in FIG. 1.

Referring now to FIG. 7B, shown is an example representation of an information object that may be used in an embodiment in connection with the techniques herein. The example 430 may represent an information object as created and stored on the server 15. In one embodiment, the information object and its internal representation may be known only to the server such as by the aggregation service. The aggregation service may provide an interface for services in connection with the information objects illustrated. The example 430 includes a link to the captured information 432, metadata 434, one or more links to action results 436 and other data 438. The field 432 may include a pointer, descriptor, or other link to the captured information, for example, as downloaded from the capture device. The field 432 may include, for example, a directory and filename of the image file, audio file, and the like, representing the captured information. In an embodiment, the field 432 may also include the actual captured information rather than a link thereto. It should be noted that in the event the captured information, such as represented in the form of an audio or video file, is larger than a specified size, an embodiment may utilize a portion of the captured information in connection with field 432. For example, if recorded audio information represents an entire song, an identifying snippet of the audio information may be selected automatically or via user interaction for use with field 432. Field 434 may include any metadata associated with the captured information represented by the information object. Field 434 may include, for example, date and time information downloaded from the capture device corresponding to the date and time when the captured information of 432 was obtained, date and time information regarding when the captured information of 432 was downloaded indicating creation of the information object, and the like. Field 436 may include one or more links to any action results associated with the captured information 432. It should be noted that fields 434 and 436 may also include links to data for these fields similar to as described above for field 432. Field 438 may represent other data that may be included in an information object and may vary with embodiment, operations and actions that can be performed using the captured information, and the like.

Figure 8:
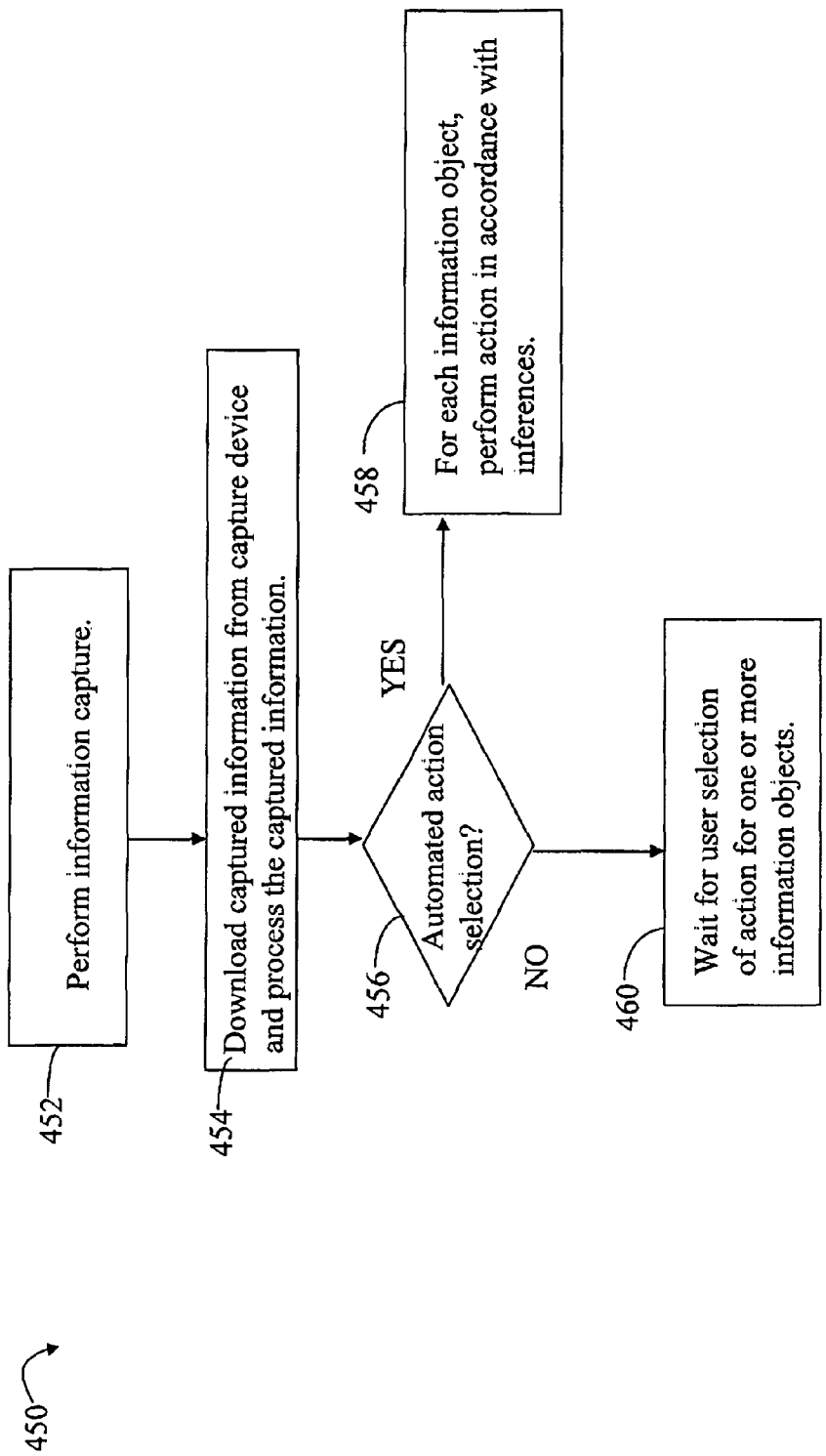
FIG. 8 is a flowchart of processing steps that may be performed in an embodiment in connection with the techniques herein.

Referring now to FIG. 8, shown is a flowchart 450 summarizing processing described in connection with the techniques herein in one embodiment. At step 452, information capture is performed. At step 454, the captured information is downloaded from the capture device to another device and further processed. In one embodiment, the captured information may be downloaded to a computer when connected to the capture device where the captured information is processed (e.g., determine corresponding text portion for captured information). In step 454, the captured information, and other information corresponding to the captured information (e.g., metadata, corresponding text portion) may be transmitted to a server for storage. In one embodiment, the server may store each portion of captured information represented as a file using an information object. At step 456 a determination is made as to whether automated action selection is to be performed for the captured information. If so, control proceeds to step 458 to perform an action for each information object in accordance with specified inferences. Otherwise, control proceeds to step 460 to wait for user selection of an action in connection with the information objects. It should be noted that in an embodiment in which automated action selection may be enabled/disabled for various actions, a determination at step 456 is performed individually with respect to each information object.

As described herein, an embodiment may operate in accordance with a first mode to perform automated action selection, or in accordance with a second mode to perform manual action selection. In connection with the latter selection mode, a user may make a selection, for example, via menu selection, dragging and dropping an information object on the application to be invoked with the selected object, and other techniques. In accordance with first mode, the action selection may be triggered based on the first word of the converted text, analyzed format and/or data type of the text, and the like. Any remaining parameter values are obtained from the next subsequent tokens of the converted text. In the second mode, the application is triggered or invoked by user selection with an input device. Additionally one or more of the parameter values may also be obtained via user input. For example, in the second mode, an action to invoke an email application may be performed manually to create an email. Additionally, when creating the email, the user may subsequently enter parameter values, for example, for the TO, CC and other fields. The email message body or text may be obtained from the converted text.

In connection with the techniques described herein, a capture device may be used to capture information, such as search queries, when a user does not have access to a device capable of performing a desired action using the captured information. At a later point in time, the capture information may be downloaded from the capture device for further processing. The techniques herein may also be used to capture information when the capture device is connected to a device capable of performing a desired action in connection with the captured information or otherwise connected to the server to utilize the aggregation service as described herein. In one embodiment, in response to inserting the capture device into another device, such as a computer, the captured information on the capture device may be automatically downloaded to the computer, and processed to obtain a text portion corresponding to the captured information. Additionally, the captured information and text portion may be transmitted to the server where an information object is created. The server stores the transmitted information for subsequent use in connection with providing aggregation services as described herein. As captured information is downloaded and corresponding text portions obtained, data is displayed on a user interface in connection with invocation of the aggregation service. Actions may be subsequently performed using the text portions. Such actions may be performed automatically or based on manual selections. Each action may result in invocation of an application or communication with a website or other target having one or more parameters. When in the automated mode, values for these parameters may be obtained from the converted text corresponding to the captured data. Performing the action may result in a user being asked to provide additional access or authentication information if such information is not already provided.

In connection with one embodiment described herein, when the capture device is connected to the computer, a web browser may be automatically invoked prompting the user to enter information for logging onto the server as a registered user of the aggregation service. After the user logs onto the server, the aggregation service may be invoked to download the captured information from the capture device to the server and further process the captured information. In another embodiment, there may be an online service provided for automated login when capture device is connected to the computer.

Once the captured information from the capture device is downloaded to the server, the aggregation service can mark the captured data stored on the capture device as processed. As such, the aggregation service may cause an indicator to be written out to the capture device indicating the captured information has been downloaded to the server. Additionally, the capture device may be used a mass storage device and additional data may also be written thereto. For example, query results or other results from performing an action may be stored on the capture device. The results may be associated with the captured information using any of a variety of techniques that will be appreciated by those skilled in the art. For example, the query results may be stored in file having a name similar to the name of the file on the capture device with the corresponding capture information. The information object corresponding to the captured information used as the query may also include a link to the query results.

In one embodiment, the inference engine and mode for action selection (e.g., automated or manual action selection) may be enabled/disable on a global level for all actions. An embodiment may also provide an option allowing a user to enable/disable automatic action selection by enabling/disabling certain rules associated with the selected actions. Thus, a user may enable/disable automated action selection for particular actions as well as certain rules for a particular action.

It should be noted that in connection with exemplary embodiments herein, particular components may be described as in the computer or other device 12 and the server 15 of FIG. 1. It will be appreciated by those skilled in the art that functionality and processing performed by some of the components of the device 12 in connection with the techniques described herein may be alternatively performed by the server 15. For example, processing performed by the inference engine 52 may be performed by the device 12 or the server 15.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for utilizing captured information, executed via a processing unit on a computing device comprising a memory whereon computer-executable instructions comprising the method are stored, comprising:
    in response to connecting a first device to a second device, the first device is a capture device comprising captured information, the captured information comprising one or more of audio information and image information, converting at least a portion of the captured information to text-based information;
    the second device recognizing a text pattern of the text-based information and selecting a desired action to be performed by the second device using an inference engine to compare at least some of the text pattern against a list of enabled actions based at least in part on at least one rule specification defining a data pattern, the data pattern applicable to at least a first instance of text and a second instance of text, the first instance of text different than and not a repeat of the second instance of text; and
    automatically performing the selected desired action using at least some of the captured information, performing the selected desired action comprising:
        determining if at least one of the first instance of text and the second instant of text comprises characters corresponding to a name and numbers corresponding to a phone number;
        if a determination is made that at least one of the first instance of text and the second instant of text comprises characters corresponding to a name and numbers corresponding to a phone number, determining if the name corresponds to an existing name in an address book; and
        if a determination is made that the name corresponds to the existing name in the address book, adding the phone number to an address book entry associated with the existing name.

2. The method of claim 1, the at least some of the recognized text pattern comprising query terms and the desired action comprising performing a search query.

3. The method of claim 1, comprising capturing the captured information while the first device is connected to the second device.

4. The method of claim 1, comprising recognizing the text pattern based at least in part on a syntactic rule.

5. The method of claim 1, comprising: enabling an automated action selection mode that causes an automated selection of the desired action based on at least one inference from the at least some recognized text pattern, the automated action selection mode configured to be selectively disabled.

6. The method of claim 5, the at least one inference determined using one or more of:
    text-based syntax rules; and
    text-based formatting.

7. The method of claim 1, comprising copying the captured information from the first device to the second device, the converting at least a portion of the captured information into text-based information performed automatically in response to connecting the first device to the second device.

8. The method of claim 1, performing the selected desired action comprising:
- specifying user account information for a website location; and
- posting at least a portion of the recognized text pattern to the website location.

9. The method of claim 1, performing the selected desired action comprising invoking an application on the second device.

10. The method of claim 1, performing the selected desired action comprising transmitting at least a portion of the recognized text pattern to one or more of:
- an email application;
- an electronic calendar application; and
- a search engine.

11. The method of claim 1, comprising recognizing the text pattern based at least in part a contextual rule.

12. The method of claim 1, the captured information comprising one or more portions of the audio information, respective portions of the audio information used in connection with performing separate actions.

13. The method of claim 1, comprising storing resulting information on the capture device from performing the desired action.

14. A computer-readable storage medium comprising computer-executable instructions, which when executed at least in part via a processing unit on a computer perform acts, comprising:
- in response to connecting a first device to a second device, the first device is a capture device comprising captured information, the captured information comprising one or more of audio information and image information, converting at least a portion of the captured information to text-based information;
- the second device recognizing a text pattern of the text-based information and selecting a desired action to be performed by the second device using an inference engine to compare at least some of the text pattern against a list of enabled actions based at least in part on at least one rule specification defining a data pattern, the data pattern applicable to at least a first instance of text and a second instance of text, the first instance of text different than and not a repeat of the second instance of text; and
- automatically performing the selected desired action using at least some of the captured information, performing the selected desired action comprising:
  - determining if at least one of the first instance of text and the second instant of text comprises characters corresponding to a name and numbers corresponding to a phone number;
  - if a determination is made that at least one of the first instance of text and the second instant of text comprises characters corresponding to a name and numbers corresponding to a phone number, determining if the name corresponds to an existing name in an address book; and
  - if a determination is made that the name corresponds to the existing name in the address book, adding the phone number to an address book entry associated with the existing name.

15. The computer-readable storage medium of claim 14, comprising capturing the captured information while the first device is connected to the second device.

16. The computer-readable storage medium of claim 14, comprising recognizing the text pattern based at least in part on a syntactic rule.

17. The computer-readable storage medium of claim 14, comprising recognizing the text pattern based at least in part on a contextual rule.

18. The computer-readable storage medium of claim 14, the captured information comprising one or more portions of the audio information, respective portions of the audio information used in connection with performing separate actions.

19. The computer-readable storage medium of claim 14, comprising storing resulting information on the capture device from performing the desired action.

20. A system for utilizing captured information, comprising:
- one or more computer based components configured to:
  - in response to connecting a first device to a second device, the first device is a capture device comprising captured information, the captured information comprising one or more of audio information and image information, convert at least a portion of the captured information to text-based information;
  - recognize a text pattern of the text-based information and select a desired action to be performed by the second device using an inference engine to compare at least some of the text pattern against a list of enabled actions based at least in part on at least one rule specification defining a data pattern, the data pattern applicable to at least a first instance of text and a second instance of text, the first instance of text different than and not a repeat of the second instance of text; and
  - automatically perform the selected desired action using at least some of the captured information, performing the selected desired action comprising:
    - determining if at least one of the first instance of text and the second instant of text comprises characters corresponding to a name and numbers corresponding to a phone number;
    - if a determination is made that at least one of the first instance of text and the second instant of text comprises characters corresponding to a name and numbers corresponding to a phone number, determining if the name corresponds to an existing name in an address book; and
    - if a determination is made that the name corresponds to the existing name in the address book, adding the phone number to an address book entry associated with the existing name.

* * * * *